(12) United States Patent
Pradhan et al.

(10) Patent No.: US 8,595,274 B2
(45) Date of Patent: Nov. 26, 2013

(54) RANDOM NUMBER GENERATOR

(75) Inventors: Pravas Pradhan, Beaverton, OR (US);
Andrew M. Volk, Granite Bay, CA (US); Praveen Dani, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1487 days.

(21) Appl. No.: 11/967,716

(22) Filed: Dec. 31, 2007

(65) Prior Publication Data
US 2009/0172056 A1 Jul. 2, 2009

(51) Int. Cl.
*G06F 1/02* (2006.01)
(52) U.S. Cl.
USPC .......................................... 708/250; 708/255
(58) Field of Classification Search
USPC .................................. 708/250–256
See application file for complete search history.

(56) References Cited

U.S. PATENT DOCUMENTS

| | | | |
|---|---|---|---|
| 6,314,440 B1 * | 11/2001 | O'Toole et al. | 708/250 |
| 7,526,087 B2 | 4/2009 | Sun | |
| 2003/0131031 A1 * | 7/2003 | Klass | 708/250 |
| 2003/0185392 A1 | 10/2003 | Sun | |
| 2004/0139132 A1 * | 7/2004 | Lutkenhaus et al. | 708/250 |
| 2005/0055392 A1 * | 3/2005 | Saito | 708/251 |
| 2006/0050877 A1 | 3/2006 | Nakamura | |
| 2007/0168676 A1 | 7/2007 | Fayad et al. | |
| 2008/0091753 A1 * | 4/2008 | Curatolo et al. | 708/200 |
| 2008/0183788 A1 * | 7/2008 | Song et al. | 708/251 |
| 2008/0270502 A1 * | 10/2008 | Barak et al. | 708/253 |
| 2009/0013019 A1 * | 1/2009 | Tapster et al. | 708/250 |

FOREIGN PATENT DOCUMENTS

| | | |
|---|---|---|
| JP | 2003-150374 A | 5/2003 |
| JP | 2007-207054 A | 8/2007 |
| TW | 0557636 B | 10/2003 |
| WO | 2007/096598 A2 | 8/2007 |

OTHER PUBLICATIONS

Office Action received for Chinese Patent Application No. 200810190335.9, mailed on Apr. 2, 2010, 6 pages of Office Action and English translation of 7 pages.
Office Action received for German Patent Application No. 102008061878.8-53 Mailed on May 29, 2009; 10 pages (including English translation of 5 pages).
Office Action received for Japanese Patent Application No. 2008-332214, mailed on Sep. 14, 2010, 3 pages of Office Action and 4 pages of English translation.
Office Action received for Japanese Patent Application No. 2008-332214, mailed on Apr. 19, 2011, 6 pages of Office Action including 3 pages of English translation.
Office Action dated Jun. 24, 2011 issued in related Chinese Patent Application No. 200810190335.9.

* cited by examiner

*Primary Examiner* — Chuong D Ngo
(74) *Attorney, Agent, or Firm* — Grossman, Tucker, Perreault & Pfleger, PLLC (57) ABSTRACT

Generally, this disclosure describes a system and method for generating random numbers. In at least one embodiment described herein, the method may include generating random bits in accordance with at least one security application via an integrated circuit, said integrated circuit including a true random number generator having an analog core. The method may further include providing, via an internally generated power supply, power to said analog core via a voltage regulator associated with said true random number generator. Of course, additional operations are also within the scope of the present disclosure.

14 Claims, 6 Drawing Sheets

RANDOM NUMBER GENERATOR

FIELD

The present disclosure relates to a random number generator, and, more particularly, to an attack immune true random number generator.

BACKGROUND

The art of cryptography requires good random numbers. Random number generators may be required to generate public/private key pairs for asymmetric algorithms such as Rivest, Shamir, Adelman (RSA), Digital Signature Algorithm (DSA), and Diffie-Helman. A random number generator may be a computational device designed to generate a sequence of numbers and/or symbols that lack any discernible pattern. Since security protocols may rely on the unpredictability of the keys they use, random number generators for cryptographic applications must meet sometimes stringent requirements.

There are two principal methods used to generate random numbers. A pseudorandom number generator (PRNG) uses deterministic processes to generate a series of outputs from an initial seed state. That is, no randomness is involved in the development of future states of the system. In contrast, a true random number generator (TRNG) uses a non-deterministic source to produce randomness. Some TRNGs operate by measuring unpredictable natural processes, such as thermal noise, atmospheric noise, or nuclear decay. A random number generator configured to shield a system from various attack vulnerabilities may be required.

BRIEF DESCRIPTION OF THE DRAWINGS

Features and advantages of embodiments of the claimed subject matter will become apparent as the following Detailed Description proceeds, and upon reference to the Drawings in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Generally, this disclosure describes an attack immune true random number generator. In at least one embodiment described herein, an integrated circuit configured to generate random bits in accordance with at least one security application is provided. The integrated circuit may include a true random number generator including an analog core. The true random number generator may also include a voltage regulator configured to provide an internally generated power supply to the analog core.

Figure 1:
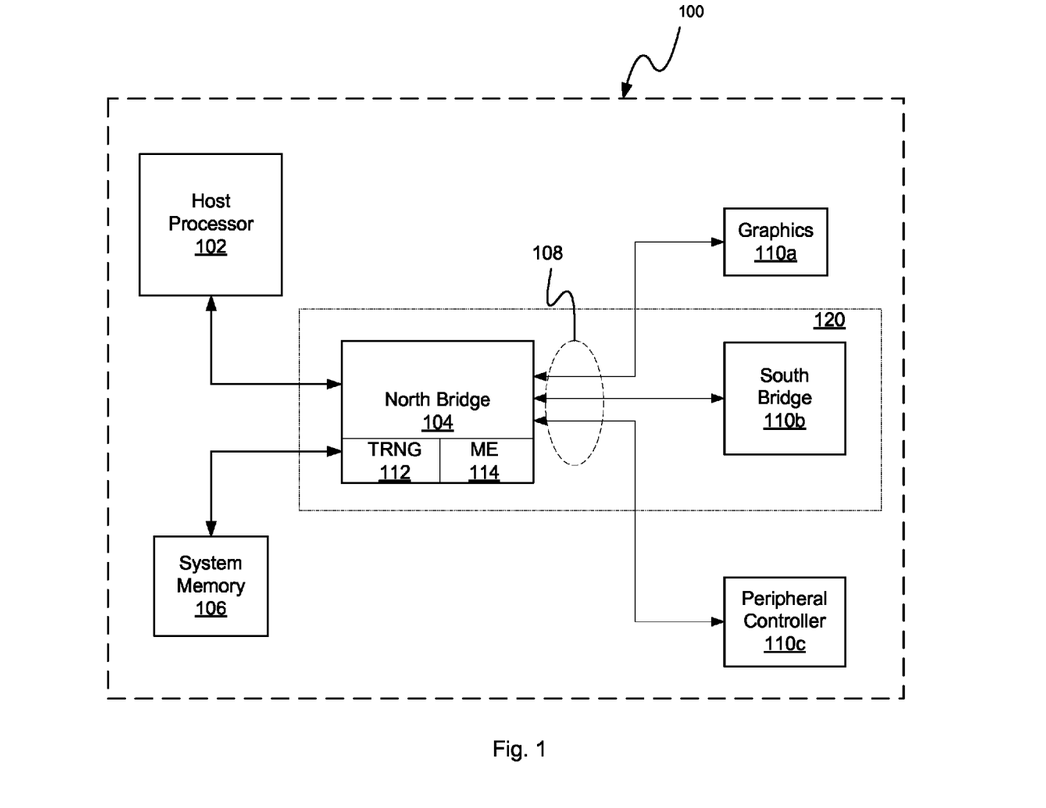
FIG. 1 depicts an exemplary embodiment of a system in accordance with the present disclosure.

FIG. 1 depicts illustrates a system embodiment 100 consistent with the present disclosure. The system 100 may include a host processor 102, chipset circuitry 104 and system memory 106. The host processor 102 may include one or more processor cores and may be configured to execute system software (not shown). System software may include, for example, operating system code (e.g., OS kernel code) and local area network (LAN) driver code. Chipset circuitry 120 may generally include "North Bridge" circuitry 104 to control communication between the processor 102, system memory 106, and bus circuitry 108. Bus circuitry may include I/O bus circuitry which may comply, or may be compatible with, PCI-Express communications protocol to provide communications between "North Bridge" circuitry 104 and components 110a-c. Components 110a-c may include, but are not limited to, video/graphics 110a and/or other peripheral controllers 110c. Also, chipset circuitry 120 may include "South Bridge" circuitry 110b configured to control I/O communications between the host system and various components, including but not limited to, bus architectures, I/O, storage, audio codecs, memory, firmware, power management, clock generation, local area network (LAN) and wireless LAN (WLAN). Of course, numerous other components may be used in accordance with system 100 as well.

In some embodiments, "North Bridge" 104 of chipset 120 may include true random number generator (TRNG) 112. TRNG 112 may be controlled by manageability engine (ME) 114, which may also be located within the "North Bridge" 104 of chipset 120. TRNG 112 may include an analog core that may be configured to produce a random number bit stream. If the analog core is subjected to external voltage changes or noise, the randomness (entropy) of the data produced in the analog core may be changed. Thus, the keys and encryption codes generated from that data may be less secure. In the embodiments described herein, the analog core may be surrounded by various circuitries configured to protect it from external influence. Data from the analog core in TRNG 112 may be passed to manageability engine 114 for further refinement and collection.

Figure 2:
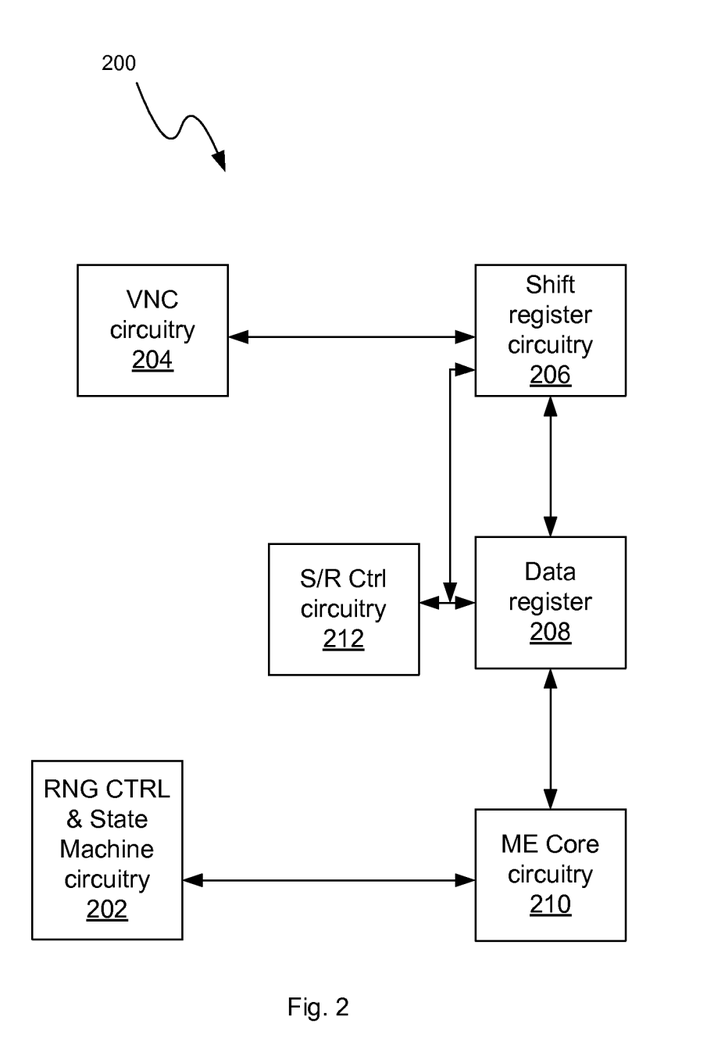
FIG. 2 depicts an exemplary embodiment of a manageability engine in accordance with the present disclosure.

Referring now to FIG. 2, an exemplary embodiment of manageability engine 200 is shown. In some embodiments, manageability engine 200 may function as an embedded microcontroller within the North Bridge 104 of chipset 120. ME 200 may be configured to handle tasks in conjunction with and/or separately from host processor 102. ME 200 may include its own microcode and register files. Some microcode may be stored in ROM and other routines may be loaded via a secure means from memory. ME 200 may control the operation of TRNG 112 through the random number generator control (RNG CTRL) and State Machine circuitry 202. In response to the execution of certain microcode, TRNG 112 may be enabled to produce random bit streams or disabled to save power.

Data passed to ME 200 from TRNG 112 may be passed to Von Neumann Corrector (VNC) circuitry 204. The data produced by the analog core may have a bias, i.e. more 1's than 0's or vice versa. VNC circuitry 204 may be configured to analyze pairs of bits and in the event that they are not equal select the first one. Bit pairs "00" and "11" may be discarded entirely. Therefore, VNC circuitry 204 may be configured to some or all of the bias from a biased random stream. In some embodiments, the bit located between the pairs of data processed by VNC circuitry 204 may also be thrown away to reduce prior state dependency. For example, this may occur when a flip-flop that is in a state has a slightly higher probability of wanting to remain in that state than to change state. Since there may be an essentially equal chance of the bit pairs having the same value, on average, only approximately one in six bits may proceed past VNC circuitry 204. One possible example of data translation via VNC circuitry 204 is shown in Table 1 below. Table 1 shows the input and output data of VNC circuitry 204. In some embodiments, the last bit of a 3-bit sequence may be thrown out regardless of value. The output of VNC circuitry 204 may be the first bit of a 3-bit sequence when the first bit does not match the second bit.

TABLE 1

Von Neumann Corrector data translation table

| VNC input data sequence (3 bits) | VNC output data |
|---|---|
| 00X | No Data |
| 01X | 0 |
| 10X | 1 |
| 11X | No Data |

Once the data has been filtered by VNC circuitry 204, it may be shifted into shift register circuitry 206 (e.g., 32 bits). When shift register circuitry 206 is full, the data may be transferred to a second data register 208, from where it may be read by the ME core 210 by the shift register control (S/R Ctrl) circuitry 212. The operation of reading data register 208 may cause register 208 to be "empty". Meanwhile, shift register circuitry 206 may be filled again. If data register 208 is empty, the new random data may be transferred to data register 208. If data register 208 is not empty (i.e., not read by ME core 210), S/R Ctrl 212 may hold shift register circuitry 206 until data register 208 is empty. Any data received from VNC circuitry 204 may be discarded. In some embodiments, ME core circuitry 210 may be configured to capture and dispose of some or all of the data generated through VNC circuitry 204.

Figure 3:
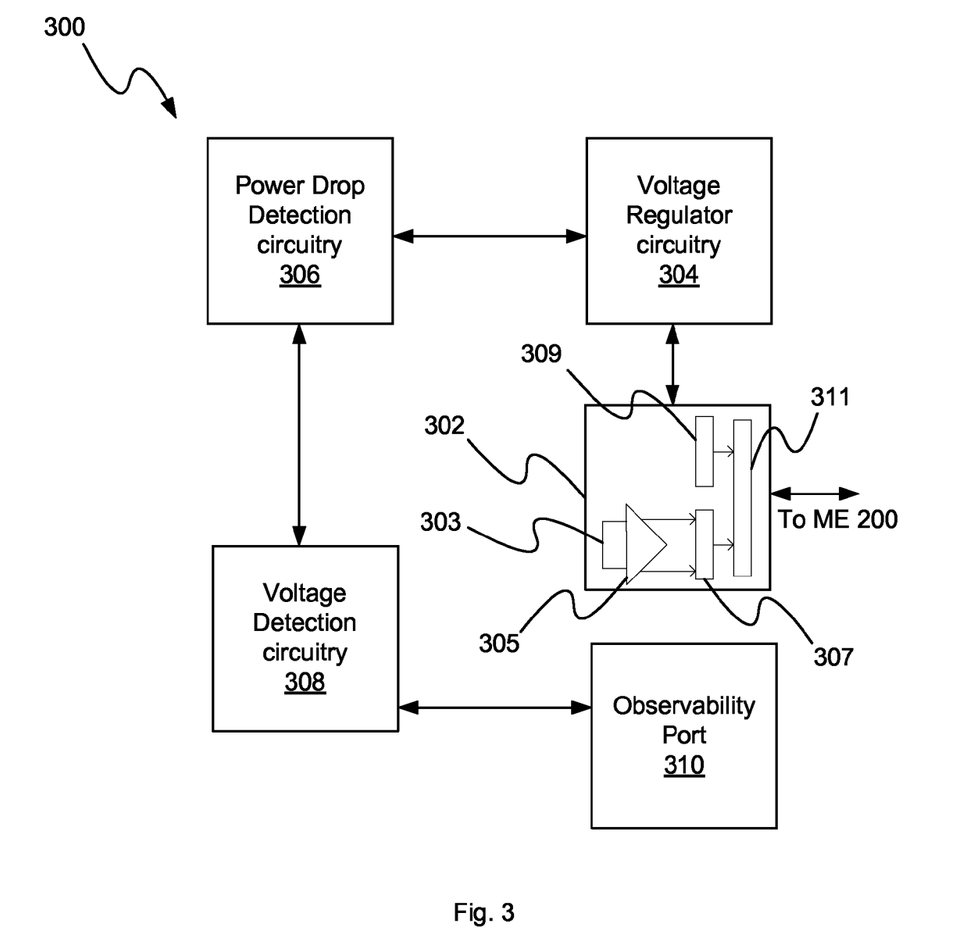
FIG. 3 depicts an exemplary embodiment of a true random number generator in accordance with the present disclosure.

Referring now to FIG. 3, an exemplary embodiment of true random number generator (TRNG) circuitry 300 is shown. TRNG circuitry 300 may be operatively connected with manageability engine 200. TRNG 300 may include analog core circuitry 302, voltage regulator circuitry 304, power drop detection circuitry 306, voltage detection circuitry 308, and observability port 310.

Analog core 302 may include at least one resistor (e.g., two 50 kΩ resistors) configured to provide a noise input 303 to at least one amplifier 305, a low frequency voltage-controlled oscillator (LFO) circuitry 307, a high frequency oscillator (HFO) circuitry 309, and a data latch 311. These key sections may be configured with differential circuitry to make them as immune to noise on the power supply as possible. The sections may also be configured to have a low sensitivity to the supply voltage. For example, certain embodiments may employ cascoding techniques configured to decrease sensitivity to supply noise or replica bias and/or calibration techniques may be used to cancel out any supply induced variations.

In some embodiments the source of the random data (i.e., entropy source) may be the thermal noise associated with at least one resistor. Thermal noise may be white noise with a flat power density across all frequencies. For example, two essentially identical resistors may provide a differential thermal noise input 303 to the at least one amplifier 305. In some embodiments, the resistors may be chosen to have a resistance value between 50 kΩ to 75 kΩ, thus yielding a nominal thermal noise of approximately 60 μV as given by equation 1 below. Of course other resistor values may be utilized as well to generate different values of thermal noise.

$$\text{Noise } V_{RMS} = \sqrt{4*K*T*R*\Delta f} \quad (1)$$

Where:
K is Boltzmann's constant
T is temperature in Kelvin
R is the value of resistor
Δf is the bandwidth over which the noise is measured In some embodiments, the differential noise thermal input 303 may be sent to amplifier 305 (e.g., three stage amplifier), which may have a gain of approximately 250 to 600. Amplifier 305 may be AC coupled (e.g., including capacitors between stages to capture the offset noise) with a 1 KHz offset cancellation cycle. To realize the gain required, the amplifier may either be configured to have a single stage with a large gain or several stages may be cascaded together. Each stage may have a relatively low and stable gain (e.g., 4 to 10) and low offset (e.g., <5 mV). During a specified time frame (e.g., each millisecond) amplifier 305 may go through a brief sequence that may capture the offset of each stage before allowing the noise of the resistors to pass through again. This may not only cancel the offset, which may overwhelm the small noise signal, it may also cancel low frequency 1/f noise below 1 KHz which may change the frequency power spectrum. While amplifier 305 is performing the offset cancellation, manageability engine 200 may be configured to ignore the data coming from TRNG circuitry 300, as it may not be sufficiently random at this time. ME 200 may also be configured to allow some time for amplifier 305 to resume proper operation before accepting bits. For example, during the phase when the amplifier is waking up, canceling offset or stabilizing, the bits generated may have some degree of non-randomness. By configuring ME to reject the bits during this wake-up, offset cancellation and stabilization phase, the randomness of the generated bits may be increased. In some embodiments, the cancellation and stabilizing sequence may take only 5% of the total bit generation time.

In some embodiments, the output of amplifier 305 may be fed as a differential voltage signal to LFO circuitry 307. LFO circuitry 307 may be configured to operate at a center frequency of approximately 600 KHz. The amplifier output voltage may cause LFO circuitry 307 to change frequency in proportion to the input signal level with a frequency gain of about 2.0 MHz/volt. As a result, the random voltage generated by the entropy source may change into a random frequency spread from LFO circuitry 307. The LFO output may be waveshaped (e.g., quasi-sinusoidal) into a fast transition complementary metal-oxide semiconductor (CMOS) signal to reduce the impact from supply noise.

In some embodiments, high frequency oscillator (HFO) circuitry 309 may include a ring-type oscillator configured to run between approximately 300 and 500 MHz. The frequency may be primarily dependent on process, but that may be fixed for a given unit. The frequency may be somewhat temperature dependent. The HFO frequency may be selected to be relatively insensitive to voltage, which may be a primary attack mechanism.

In some embodiments, an output of HFO circuitry 309 may be divided by 512 to drive the RNG CTRL and State Machine circuitry 202 of ME 200. This may provide RNG CTRL circuitry 202 a clock that may be independent of external influence. As discussed below, the output from RNG CTRL and State Machine circuitry 202 to TRNG circuitry 300 may be within a specified timing range for proper TRNG operation. Other clock sources may be dependent on a clock that may be changed externally, which may be a possible attack point for TRNG circuitry 300.

HFO circuitry 309 may be configured to generate a clock data signal and to provide this signal as an input to a data latch 311. The output from HFO circuitry 309 may be sent to latch 311 as a differential signal to make it substantially noise immune. Latch 311 may be clocked by LFO circuitry 307. HFO circuitry 309 may be approximately 1000 times faster, and the LFO frequency modulation moves its edges over a range equal to more than 20 HFO periods. Since the frequency out of LFO circuitry 307 may be random, the point where it samples the HFO oscillator output may be random, and since the range of HFO cycles sampled may be broad, the probability of LFO circuitry sampling a one or a zero is uniform, assuming a 50% duty cycle on HFO circuitry 309. HFO circuitry 309 may be configured to have a nominal 50% duty cycle. For example, HFO circuitry 309 may be configured to have a divide-by-2 circuit at the output stage to give a 50% duty cycle from HFO. Some bias may still enter the data stream. VNC circuitry 204 may be used to remove this bias.

In some embodiments, data latch 311 may have no prior state dependence and may be configured to sample the output from HFO circuitry 309. For example, the stages of data latch 311 may be isolated using inverting buffers. The output of data latch 311 may be fed to VNC circuitry 204 in ME 200 through the Gated Level Shifters (not shown). The level shifters may be configured to translate the signaling levels of analog core 302 to the different voltage of the ME signals. The control signals from ME 200 to TRNG circuitry 300 may also be translated in the opposite direction by the level shifters. The level shifters may be gated so that when ME 200 powers down TRNG circuitry 300, or when TRNG circuitry 300 is powered before ME 200 comes on, the signaling between the domains is not active. ME 200 and TRNG circuitry 300 may be on different power supplies.

In some embodiments, analog core 302 may be configured to have a fully differential data-path in order to reject common mode noise in the system. As discussed herein, the presence of noise on the power supply may impact the differential circuits. The impact may be the same on both sides of analog core 302 affecting the common-mode levels in core 302. The next differential input may be designed to have excellent common-mode rejection, thereby removing the impact of the noise. Amplifier circuitry 305, as an example, may have a theoretical rejection of 300 dB, although practical limitation in the digital processes may limit this to 80 dB. The noise reduction provided by voltage regulator 304 and the PSRR of the differential circuits may combine to reduce noise on the supplies.

In some embodiments, the analog circuits described herein may be cascoded to improve the power supply rejection ratio. Cascoding is a circuit technique that may increase the output impedance of analog circuits, thus making them more immune to supply changes. In one exemplary embodiment, the cascoded design may be configured to work as low as 0.9V (an exemplary voltage for the silicon process on which TRNG circuitry 300 is made may be 1.25V). Further, folded cascode methods may be used to reduce the required operating supply voltage. Voltage regulator 304 may target 1.05 volts. Since the circuits may operate at lower voltages, even small changes that make it past voltage regulator 304 before power drop detection circuitry 306 trips may not cause analog core 302 to fail.

Voltage regulator 304, power drop detection circuitry (PD-DET) 306, voltage detection circuitry 308 and observability port 310 may be configured to prevent or detect external influences or attacks that may affect the entropy of the data stream. These components are each operatively connected with analog core circuitry 302. Each of these components are discussed in further detail below.

In some embodiments, voltage regulator 304 may be configured to provide a voltage to analog core circuitry 302 of TRNG circuitry 300. Analog core circuitry 302 may operate on an internally generated power supply supplied via voltage regulator circuitry 304. This configuration may reduce the ability of a potential hacker to compromise the behavior of the circuit elements by modulating the supply. Voltage regulator circuitry 304 may receive a reference voltage from a low-voltage bandgap powered by the core voltage. This may operate to stabilize the voltage and provide immunity to low frequency noise or voltage modulation within the operating range of the bandgap. At higher frequencies (e.g., around 10 MHz) the ability of the bandgap to reject power supply noise (as measured by the PSRR) may become worse and actually begin to amplify noise. In some embodiments, in order to shield the analog core supply, the reference voltage may be low pass filtered by a simple two-pole RC filter to remove this amplified noise and any other higher frequency noise.

In some embodiments, the supply voltage for voltage regulator circuitry 304 may be chosen to be a noisy supply such as a memory power supply (e.g., double data rate (DDR)). This noisy supply may consume more power than TRNG circuitry 300 and may prevent bit detection out of the supply current signature. Current consumed by circuits driven by voltage regulator circuitry 304 may be a small portion of the total current supplied by the power supply. The power supply current may dip when current is drawn from the supply, thus indicating a "1". If the amount of current drawn is a small portion of the net current supplied by the voltage source, then it may become difficult to detect the probability of a "1" or "0". Reading the supply current of analog core circuitry 302 may provide information to the data stream being produced there. The use of fully differential circuitry for all key elements may make net current more stable and not substantially different for different data outputs. The voltage regulator 304 power supply may be heavily filtered to remove high-frequency noise from entering or leaving. Further, whatever current signature might escape may be masked by the orders of magnitude higher noise of the DDR block. For example, the noise on the DDR supply voltage may be about 200 mV peak-to-peak, while the noise produced by the TRNG may be only a few millivolts.

In some embodiments, TRNG circuitry 300 may be protected from external access. In other words, there may be no dedicated supply, pin or balls capable of providing direct access to TRNG circuitry 300. Further, TRNG circuitry 300 may be shielded from access via any unsecured software mechanism. With the exception of the test mode described below, TRNG circuitry 300 may not allow control access by a user, hacker or other unsecured access mechanism. TRNG circuitry 300 may be controlled through ME firmware. The control for TRNG circuitry 300 may be protected through the security of this firmware.

In some embodiments, TRNG circuitry 300 may be controlled by the clock generated within analog core circuitry 302. Therefore, by not using the clocks available on the platform to control TRNG circuitry 300, any possibility of an attack by compromising the clocks may be avoided. No external clocks are used, thus avoiding manipulation using unsecured firmware. HFO circuitry 309 may be the source of the clock to the TRNG control logic. This clock may be configured to have a relatively stable configuration across process, voltage and temperature and it may be more stable than simple oscillators. The range of the frequencies generated by the HFO circuitry 309 may be stabilized by constant transconductance (Gm) circuitry that may be configured to track and reduce the variability of the circuit. The clock may be protected by voltage regulator circuitry 304 and/or PDDET circuitry 306. Thus, the embodiments described herein may not utilize external clock driver sources normally used by the "North Bridge" 104 of chipset 120 (e.g., for the front side bus, memory or graphics) and may not be generated using the real-time clock (RTC) on the South Bridge. These sources may be attacked to compromise the clock period and possibly affect the TRNG control logic timing.

In some embodiments, HFO circuitry 309 may be designed to be a current controlled oscillator whose tail current may be supplied by a stable reference circuit. The reference circuit may be designed to provide a relatively stable current by using a folded cascode (Gm) bias based current reference circuit design. Each stage of HFO circuitry 309 may be configured to include a folded cascode stage. The current controlled oscillator and the reference generator may be powered by voltage regulator circuitry 304. This may ensure that the clock may be relatively stable across process, voltage and temperature.

Figure 4:
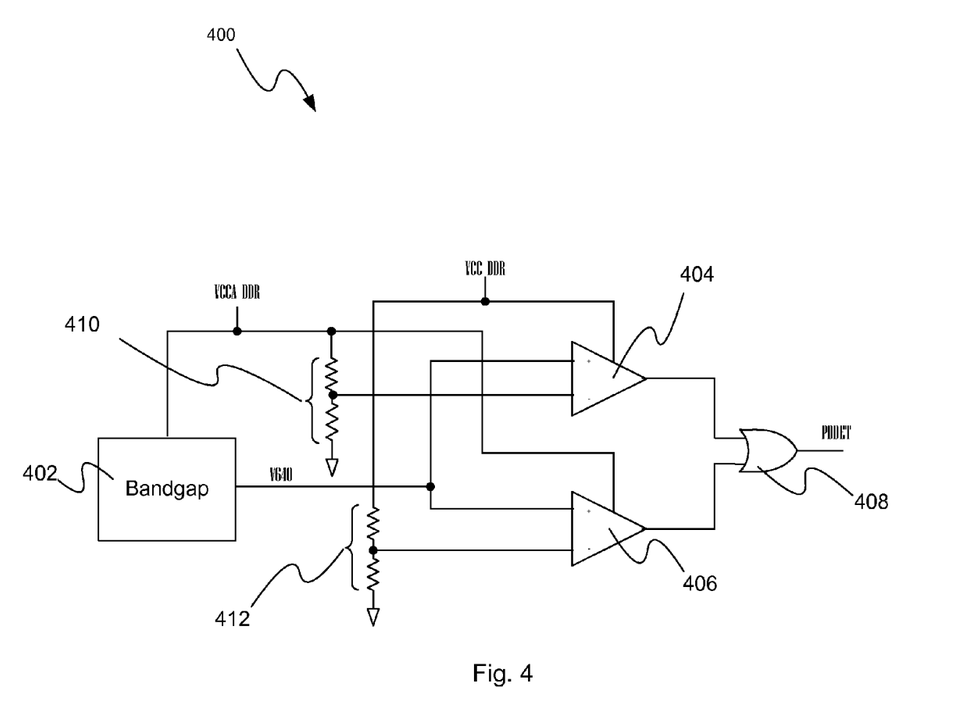
FIG. 4 depicts an exemplary embodiment of a power drop detector in accordance with the present disclosure.

Referring now to FIG. 4, an exemplary embodiment of power drop detector circuitry (PDDET) 400 is shown. TRNG 300 may utilize power drop detector circuitry 400 to shut down bit production if a threat is detected on the supply lines, for example, if power drops below a predetermined minimum threshold. If the noise (AC+DC) on the supply voltage nears a level where the bandgap can no longer produce a stable voltage or in the event that voltage regulator circuitry 304 stops filtering the noise adequately, PDDET 400 may send a signal to stop the bit production and reset the state machine 202. If the power is not stable and drops below an instantaneous minimum threshold, a comparator in PDDET 400 may send a signal to RNG CTRL and State Machine circuitry 202. For example, if the detection is two nanoseconds wide, RNG CTRL 202 may catch it, immediately invalidate any bits in the pipeline of VNC 204, and send the TRNG analog core circuitry 302 back to its offset cancellation state for a minimum time. If PDDET 400 continues to detect bad voltage levels, TRNG circuitry 300 may be held in this inactive state. Only when PDDET 400 goes inactive will TRNG circuitry 300 be sent through the remainder of the offset sequence and bit production may be continued. In some embodiments, since there may be two power supplies feeding aspects of TRNG 300 (e.g., VCCA_DDR and VCC_DDR voltages), both may have detectors attached to them, so attacks may be detected on either supply.

In some embodiments, bandgap 402 may provide a reference voltage of approximately 640 mV (V640) to comparators 404 and 406. The bandgap may be powered from the core supply "VCCA_DDR." The bandgap 402 may not guarantee operation below a given voltage (e.g., 1.0 volts). If the voltage on "VCCA_DDR" is above 1.0 volts, resistor divider 410 may produce a voltage to comparator 404 that may be above reference voltage V640 and the output voltage of comparator 404 may be a zero. If "VCCA_DDR" drops below 1.0 volts, resistor divider 410 may produce a voltage below reference voltage V640, and the output voltage of comparator 404 may be a logic one. The output of OR gate 408 may also become a logic one and may trigger the PDDET signal to stop bit production. The supply to comparator 404 may be from the DDR memory supply "VCC_DDR." Thus the comparator may be independent from the supply it is monitoring.

The supply to the internal voltage regulator for the TRNG analog core 302 may come from the DDR memory supply "VCC_DDR," and may be monitored by resistor divider 412 and comparator 406. The voltage regulator 304 may not be guaranteed to work below a given voltage (e.g., 1.15 volts). The resistor divider 412 may produce a voltage lower than reference voltage V640 when "VCC_DDR" drops below 1.15 volts, which may cause the output of comparator 406 to go to a logic one, and may cause OR gate 408 to send the PDDET signal to stop bit production. Similar to comparator 404, comparator 406 may be powered from "VCCA_DDR," the supply it is not monitoring.

While the above description deals primarily with external supply voltages dropping below the threshold voltage formed by the resistor dividers 410 and 412, it may also be possible to detect if the external voltage exceeds the safe operating range or threshold voltage. In some embodiment, this may be done with a second set of thresholds formed by a second set of resistor dividers connected to a second set of comparators (not shown) with the outputs connected to two added inputs on OR gate 408 to drive the PDDET signal.

Figure 5:
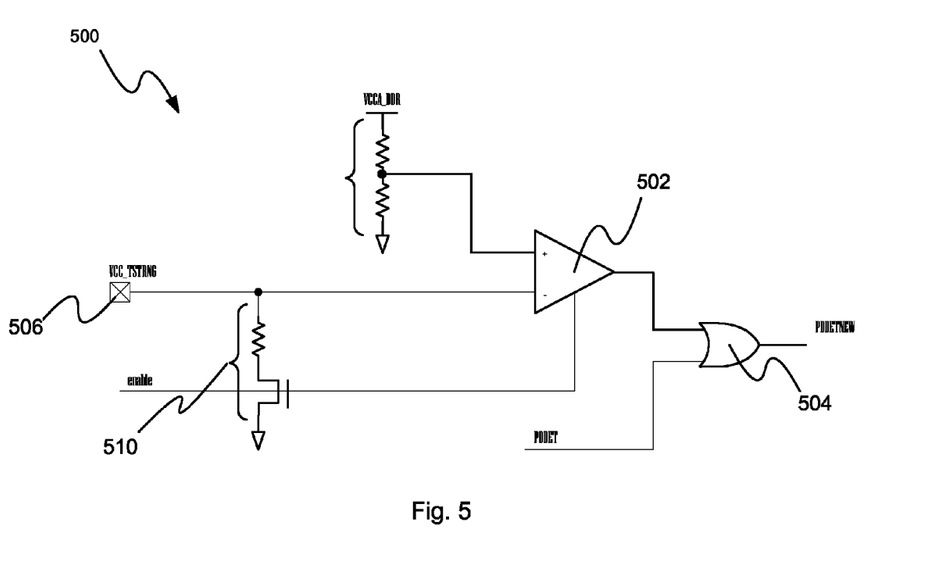
FIG. 5 depicts an exemplary embodiment of a voltage detector in accordance with the present disclosure.

Referring now to FIG. 5, an exemplary embodiment of voltage detector circuitry 500 is shown. As discussed above with reference to FIG. 3, TRNG circuitry 300 may include an observability port 310 for testing the internal DC voltages and operating point. In this way, a ball may be used to provide a test mode for debug and/or manufacturing testing. Access to this test mode may be disabled by a fuse and the test mode ball may be connected to VSS. Voltage detector circuitry 500 may be configured to prevent a possible attacker from identifying and subsequently using the ball to gain entry to TRNG circuitry 300. Voltage detector circuitry 500 may be placed on observability port 310 (e.g., pin) to sense the ball voltage and shut down the bit production if the ball is raised close to or beyond the internal voltage of voltage regulator 304. In some embodiments, voltage detector circuitry 500 may include a circuit similar to PDDET 400. If the voltage on the test ball is raised high enough, parasitic diodes in the circuits around the ball may provide current to TRNG analog core circuitry 302. This may be prevented by detecting the voltage on the ball. If the voltage is too high, bit production from TRNG circuitry 300 may be shut down until the attack is stopped. This approach may be similar to PDDET 400 as described above with regard to FIG. 4.

In some embodiments, resistor divider 508 may produce a reference voltage not in excess of the output of the voltage regulator from core voltage "VCCA_DDR" for comparator 502. This reference voltage may be compared to the voltage on the observability port 310 (pin "VCC_TSTRNG" 506). If the voltage on "VCC_TSTRNG" 506 exceeds the reference voltage from resistor divider 508, then the output from comparator 502 may go to a logic one level causing OR gate 504 to send a new version of the PDDET signal to stop bit production. When the ball is used for test purposes, the comparator may be disabled. During normal operation, the comparator may be enabled, and a transistor pull-down and resistor combination 510 may be used to pull down on "VCC_TSTRNG" 506 to insure that 506 may be low in the absence of any other driving source.

As discussed above with reference to FIG. 3, observability port 310 may be operatively connected to voltage detector circuitry 308, which may be configured to detect a ball voltage and to shut down bit production if the ball voltage is outside a voltage range of voltage regulator circuitry 304. While the silicon process on which the TRNG circuits are made is not susceptible to a voltage below the ground potential on the observability port, some other processes may have that issue. Detection of low voltages may be done with another comparator (not shown) with its output connected to an additional input on OR gate 504 to drive the PDDETNEW signal.

Figure 6:
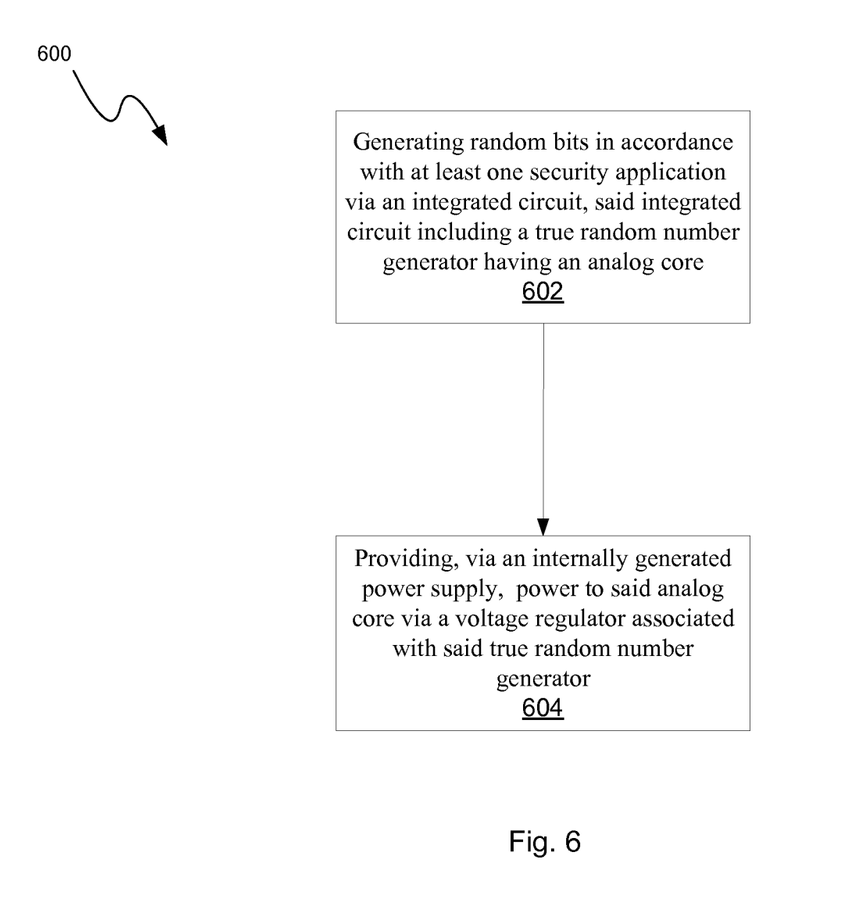
FIG. 6 depicts an exemplary embodiment of a method in accordance with the present disclosure.

FIG. 6 depicts a flowchart 600 of exemplary operations consistent with the present disclosure. In one exemplary embodiment, operations may include generating random bits in accordance with at least one security application via an integrated circuit, said integrated circuit including a true random number generator having an analog core (602). Operations may further include providing an internally generated power supply to said analog core via a voltage regulator associated with said true random number generator (604). Of course numerous additional operations are also within the scope of the present disclosure.

The term "memory" as used in any embodiment herein may comprise one or more of the following types of memory: semiconductor firmware memory, programmable memory, non-volatile memory, read only memory, electrically programmable memory, random access memory, flash memory, magnetic disk memory, and/or optical disk memory.

Either additionally or alternatively, memory may comprise other and/or later-developed types of computer-readable memory. Embodiments of the methods described herein may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The term "circuitry", as used in any embodiment herein, may comprise, for example, singly or in any combination, hardwired circuitry, programmable circuitry, state machine circuitry, and/or firmware that stores instructions executed by programmable circuitry.

The term "security application", as used in any embodiment herein, may comprise, for example, a cryptographic application or protocol, a key management scheme, anything intended to protect a cipher or a block of code and/or any system configured to generate at least one bit.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus, comprising:
an integrated circuit configured to generate random bits in accordance with at least one security application, said integrated circuit including a true random number generator including an analog core, said true random number generator including a voltage regulator having an internally generated power supply configured to provide power to said analog core, wherein:
said internally generated power supply is derived from said voltage regulator, said voltage regulator being powered by an external voltage supply; and
said apparatus further comprises power drop detection circuitry configured to monitor said internally generated power supply and to shut down bit production if said power supplied to said analog core drops below or exceeds a first threshold, or drops below or exceeds a second threshold.

2. The apparatus according to claim 1, further comprising an observability port configured to test internal voltages associated with said true random number generator.

3. The apparatus according to claim 2, wherein said observability port is operatively connected to voltage detector circuitry configured to detect a ball voltage and to shut down bit production if said ball voltage is outside a voltage range of said voltage regulator.

4. The apparatus according to claim 1, wherein said true random number generator is controlled via a clock generated by said analog core.

5. A system, comprising:
a host processor;
at least one memory; and
an integrated circuit configured to generate random bits in accordance with at least one security application, said integrated circuit including a true random number generator including an analog core, said true random number generator including a voltage regulator having an internally generated power supply configured to provide power to said analog core,
wherein said internally generated power supply is derived from said voltage regulator, said voltage regulator being powered by an external voltage supply and said system further comprises power drop detection circuitry configured to monitor said internally generated power supply and to shut down bit production if said power supplied to said analog core drops below or exceeds a first threshold, or drops below or exceeds a second threshold.

6. The system according to claim 5, further comprising a manageability engine associated with said integrated circuit, said manageability engine including firmware configured to control said true random number generator.

7. The system according to claim 5, further comprising an observability port configured to test internal voltages associated with said true random number generator.

8. The system according to claim 7, wherein said observability port is operatively connected to voltage detector circuitry configured to detect a ball voltage and to shut down bit production if said ball voltage is outside a voltage range of said voltage regulator.

9. The system according to claim 5, wherein said true random number generator is controlled via a clock generated by said analog core.

10. A method, comprising:
generating random bits in accordance with at least one security application via an integrated circuit, said integrated circuit including a true random number generator having an analog core;
providing, via an internally generated power supply, power to said analog core via a voltage regulator associated with said true random number generator, wherein said internally generated power supply is derived from said voltage regulator, said voltage regulator being powered by an external voltage supply; and
monitoring said internally generated power supply with power drop detection circuitry, and stopping bit production if said power supplied to said analog core drops below or exceeds a first threshold, or drops below or exceeds a second threshold.

11. The method according to claim 10, further comprising testing internal voltages associated with said true random number generator via an observability port.

12. The method according to claim 10, wherein said observability port is operatively connected to voltage detector circuitry configured to detect a ball voltage and to shut down bit production if said ball voltage is outside a voltage range of said voltage regulator.

13. An article comprising a non-transitory computer readable storage medium having stored thereon instructions that when executed by a machine result in the following:

generating random bits in accordance with at least one security application via an integrated circuit, said integrated circuit including a true random number generator having an analog core;

providing, via an internally generated power supply, power to said analog core via a voltage regulator associated with said true random number generator, wherein said internally generated power supply is derived from said voltage regulator, said voltage regulator being powered by an external voltage supply; and monitoring said internally generated power supply with power drop detection circuitry, and stopping bit production if said power supplied to said analog core drops below or exceeds a first threshold, or drops below or exceeds a second threshold.

14. The article according to claim 13, further comprising testing internal voltages associated with said true random number generator via an observability port.

* * * * *